United States Patent
Zhang et al.

(10) Patent No.: US 6,424,543 B1
(45) Date of Patent: Jul. 23, 2002

(54) INTEGRAL DC TO DC CONVERTER

(75) Inventors: Alpha J. Zhang; Guisong Huang; Yilei Gu, all of Neihu Taipei (TW)

(73) Assignee: Delta Electronics, Inc., Neihu Taipei (TW)

( * ) Notice: Subject to any disclaimer, the term of this patent is extended or adjusted under 35 U.S.C. 154(b) by 0 days.

(21) Appl. No.: 09/811,757

(22) Filed: Mar. 19, 2001

(30) Foreign Application Priority Data

Nov. 30, 2000 (TW) ........................................ 89125526 A

(51) Int. Cl.[7] ...................... H02M 3/335; H02M 3/5387
(52) U.S. Cl. ........................................... 363/17; 363/132
(58) Field of Search ............................ 363/17, 16, 25, 363/132, 131, 133, 24

(56) References Cited

U.S. PATENT DOCUMENTS

| | | | | |
|---|---|---|---|---|
| 4,796,173 A | * | 1/1989 | Steigerwald | 363/25 |
| 5,245,520 A | * | 9/1993 | Imbertson | 363/17 |
| 5,500,791 A | * | 3/1996 | Kheraluwala et al. | 363/17 |

* cited by examiner

Primary Examiner—Rajnikant B. Patel
(74) Attorney, Agent, or Firm—Volpe and Koenig, P.C.

(57) ABSTRACT

An integral DC to DC converter includes an input capacitor, a DC to AC circuit, a transformer, a rectifying circuit, a filtering capacitor and a control signal generator. The DC to AC circuit is connected with the input capacitor for converting the input DC voltage to a high frequency first AC voltage and the DC to AC circuit includes four full-bridge switching devices. The transformer is used for converting the first AC voltage into a second AC voltage. The rectifying circuit is connected to the secondary winding of the transformer for rectifying the second AC voltage to the output DC voltage. The filtering capacitor is connected to the rectifying circuit for filtering the output DC voltage. The control signal generator is used for providing a control signal to control the full-bridge switching device.

9 Claims, 5 Drawing Sheets

INTEGRAL DC TO DC CONVERTER

FIELD OF THE INVENTION

The present invention relates to a DC to DC converter, and more particularly to an integral DC to DC converter for converting at least an input DC voltage into at least an output DC voltage.

BACKGROUND OF THE INVENTION

FIG. 1 is a circuit diagram of a full-bridge phase-shifted soft-switching DC to DC converter according to the prior art. The DC voltage inputted into the input capacitor C11 is converted into a high frequency square-wave AC voltage through the switching devices S11 to S14 and sent to the primary winding of the transformer Tr. The secondary winding of the transformer Tr outputs two sets of square-wave alternative voltages having the same amplitudes, which are then rectified by the rectifier diode D11 and D12 and filtered by a filtering circuit composed of the inductor Lo and the capacitor C3 in series to obtain an output DC voltage. The two switching devices in the first arm of the full-bridge, i.e. S11 and S12, and the two switching devices in the second arm of the full-bridge, i.e. S13 and S14, are complementarily driven out of phase at 50% duty ratio of square-wave control signal. The output voltage is regulated by varying the phase shift of the control signal in the first arm and the control signal in the second arm. In addition, the conversion efficiency of the converter could be increased by using the stored energy in the inductor Lk in the input loop of the transformer Tr to perform the soft turn-on of the switching devices S11 to S14.

FIG. 2 is a circuit diagram of an asymmetric half-bridge DC to DC converter according to the prior art. The DC voltage inputted into the input capacitor C21 is converted into a high frequency square-wave AC voltage through the switching devices S21 and S22. The DC component existing in the high frequency square-wave AC voltage is then filtered via the blocking capacitor Cb so as to send a square-wave AC voltage to the primary winding of the transformer Tr. The circuit loop in the secondary section of the transformer Tr includes rectifier diodes D21, D22, a inductor Lo and a capacitor C3, wherein the output DC voltage is regulated by varying the square-wave pulse time of the control signal of the switching devices S21, S22. In addition, the soft turn-on of the switching devices S21 and S22 is performed by using the stored energy in the inductor Lk in the input loop of the transformer Tr.

FIG. 3 is a circuit diagram of a full-bridge series-parallel resonant DC to DC converter according to the prior art. The DC voltage inputted into the capacitor C31 is converted into a high frequency square-wave AC voltage through the switching devices S31 to S34. The high frequency square-wave AC voltage is resonated by the series resonance circuit composed of a series resonant inductor Ls and a series resonant capacitor Cs and the parallel resonant circuit composed of a parallel resonant capacitor Cp and the input magnetizing inductor of the transformer Tr, thereby obtaining a sinusoidal alternative voltage as the input voltage of the transformer Tr. The circuit loop in the secondary section of the transformer Tr includes rectifier diodes D31, D32, a inductor Lo and a capacitor C3, wherein the output DC voltage is regulated by varying the switching frequency of the switching devices S31 to S34 to change the input voltage of the transformer Tr.

The DC-to-DC converters described in FIGS. 1 to 3 are suitable for the condition where the relative change of the input DC voltage and the output DC voltage is not wide. The operation performance and the conversion efficiency of the DC to DC converter are decreased with the decreasing output voltage and the increasing input voltage. Furthermore, the DC to DC converter described above can be applied to the condition where only one input DC voltage is converted into one output DC voltage, which is costly and not environmentally friendly.

Therefore, the present invention provides an integral DC to DC converter capable of converting at least one input DC voltage into at least one output DC voltage for overcoming the problems described above.

SUMMARY OF THE INVENTION

It is an object of the present invention to provide an integral DC to DC converter capable of converting at least one input DC voltage into an output DC voltage.

The integral DC to DC converter capable of converting at least one input DC voltage into an output DC voltage according to the present invention includes an input capacitor, a DC to AC circuit, a transformer, a rectifying circuit, a filtering capacitor and a control signal generator.

In accordance with an aspect of the present invention, the input capacitor is used for providing an input DC voltage. The DC to AC circuit is connected with the input capacitor for converting the input DC voltage to a high frequency first AC voltage and the DC to AC circuit includes four full-bridge switching devices. The transformer is used for converting the first AC voltage into a second AC voltage wherein the primary winding of the transformer is connected to the DC to AC circuit. The rectifying circuit is connected to the secondary winding of the transformer for rectifying the second AC voltage to the output DC voltage and the rectifying circuit includes four full-bridge rectifier diodes. The filtering capacitor is connected to the rectifying circuit for filtering the output DC voltage. The control signal generator is used for providing a control signal to control the full-bridge switching device.

Preferably, the rectifying circuit further comprises an output voltage switching element. The junction point of the output voltage switching element is connected to the filtering capacitor and the ends of the output voltage switching element are connected with the co-anode of the four full-bridge rectifier diodes and the central tapping head of the transformer.

Preferably, the control signal generator includes a first control signal generator and a second control signal generator. The first control signal generator is used to provide a first control signal for allowing the two switching devices in the first bridge arm and the two switching devices in the second bridge arm to alternately conduct and shut. In addition, the full-bridge switching devices have a first operation state corresponding to the first control signal generator. The second control signal generator is used to provide a second control signal for allowing the two switching devices in the first bridge arm to alternately conduct and shut and allowing the upper switching device in the second bridge arm to keep shutting and the lower switching device in the second bridge arm to keep conducting. Also, the full-bridge switching devices have a second operation state corresponding to the second control signal generator.

Preferably, the integral DC to DC converter according to the present invention further includes a switching element for activating one of the first control signal generator and the second control signal generator.

It is another object of the present invention to provide an integral DC to DC converter for converting at least one input DC voltage into at least one output DC voltage, which includes an input capacitor for providing the at least one input DC voltage, a DC to AC circuit connected with the input capacitor for converting the input DC voltage to a high frequency first AC voltage wherein the DC to AC circuit comprises four full-bridge switching devices, a transformer for converting the first AC voltage into a second AC voltage wherein the primary winding of the transformer is connected to the DC to AC circuit, a rectifying circuit connected to the secondary winding of the transformer for rectifying the second AC voltage to the output DC voltage wherein the rectifying circuit comprises four full-bridge rectifier diodes, a filtering capacitor connected to the rectifying circuit for filtering the output DC voltage, a control signal generator for providing a control signal to control the full-bridge switching device, and an output voltage switching element wherein the junction point of the output voltage switching element is connected to the filtering capacitor and the ends of the output voltage switching element are connected with the co-anode of the four full-bridge rectifier diodes and the central tapping head of the transformer.

It is another object of the present invention to provide an integral DC to DC converter for converting at least one input DC voltage into at least one output DC voltage, which includes an input capacitor for providing the at least one input DC voltage, a DC to AC circuit connected with the input capacitor for converting the input DC voltage to a high frequency first AC voltage wherein the DC to AC circuit comprises four full-bridge switching devices, a transformer for converting the first AC voltage into a second AC voltage wherein the primary winding of the transformer is connected to the DC to AC circuit, a rectifying circuit connected to the secondary winding of the transformer for rectifying the second AC voltage to the output DC voltage wherein the rectifying circuit comprises four full-bridge rectifier diodes, a filtering capacitor connected to the rectifying circuit for filtering the output DC voltage, a first control signal generator used to provide a first control signal for allowing the two switching devices in the first bridge arm and the two switching devices in the second bridge arm to alternately conduct and shut, a second control signal generator used to used to provide a second control signal for allowing the two switching devices in the first bridge arm to alternately conduct and shut and allowing the upper switching device in the second bridge arm to keep shutting and the lower switching device in the second bridge arm to keep conducting, and an output voltage switching element wherein the junction point of the output voltage switching element is connected to the filtering capacitor and the ends of the output voltage switching element are connected with the co-anode of the four full-bridge rectifier diodes and the central tapping head of the transformer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENTS

Figure 4:
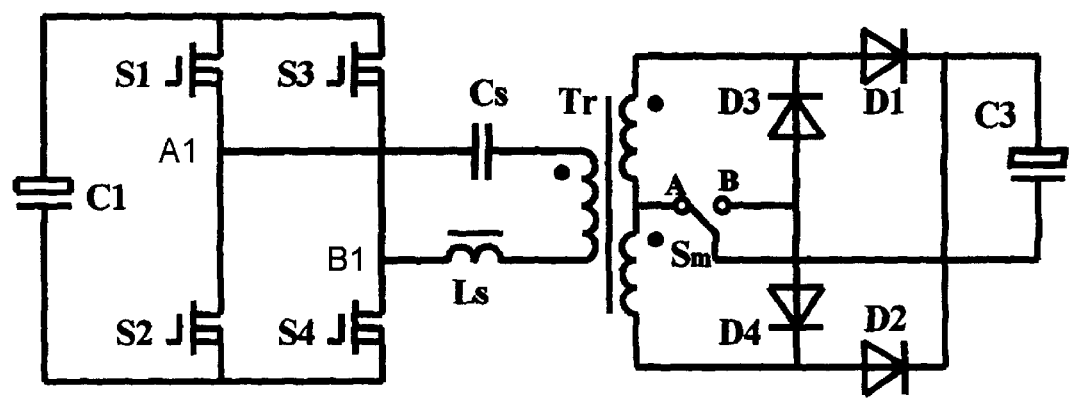
FIG. 4 is a circuit diagram of an integral DC to DC converter according to the first preferred embodiment of the present invention.

Referring to FIG. 4, the integral DC to DC converter for the first preferred embodiment of the present invention is implemented by varying the structure of the output circuit. The integral DC to DC converter includes an input capacitor C1, a set of full-bridge switching devices S1 to S4, a resonance circuit composed of a resonant inductor Ls and a series resonant capacitor Cs, a transformer, a rectifying circuit composed of four rectifier diodes D1 to D4, and a filtering capacitor C3. The input capacitor C1 is connected with the full-bridge switching devices S1 to S4. The operations of the full-bridge switching devices S1 to S4 are the same as those of the typical full-bridge switching devices by being alternately conducted and shut. Therefore, the DC voltage in the input capacitor C1 is converted into a high frequency alternative voltage. The full-bridge switching devices S1 to S4 are connected with the resonance circuit composed of the resonant inductor Ls and the series resonant capacitor Cs to form a DC to AC converting circuit. Certainly, the resonant inductor Ls can be integrated with the transformer Tr.

The transformer Tr is used for electrically isolation and converting the AC voltage outputted from the DC to AC converting circuit. The converting ratio depends on the demand. The rectifying circuit composed of four rectifier diodes D1 to D4 is operated in a full-bridge scheme. The converter circuit according to the present invention further includes an output voltage switching element Sm, wherein one end of the output voltage switching element Sm is connected to the co-anode of the four full-bridge rectifier diodes D1 to D4 and the other end of output voltage switching element Sm is connected to the central tapping head of the transformer Tr. The co-cathode of the tapping head of the transformer Tr is connected to the filtering capacitor C3.

Figure 5A:
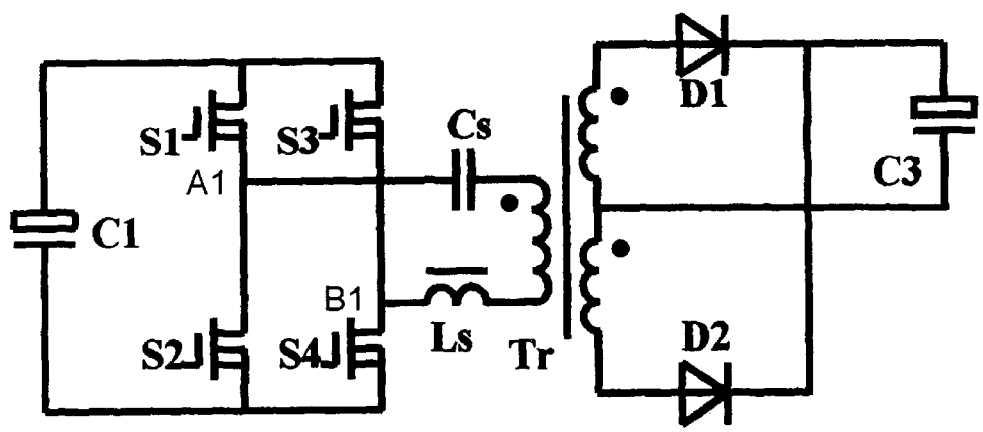
FIG. 5A is a circuit diagram illustrating the switching element of the rectifying circuit in FIG. 4 is switched to the junction point A.
Figure 5B:
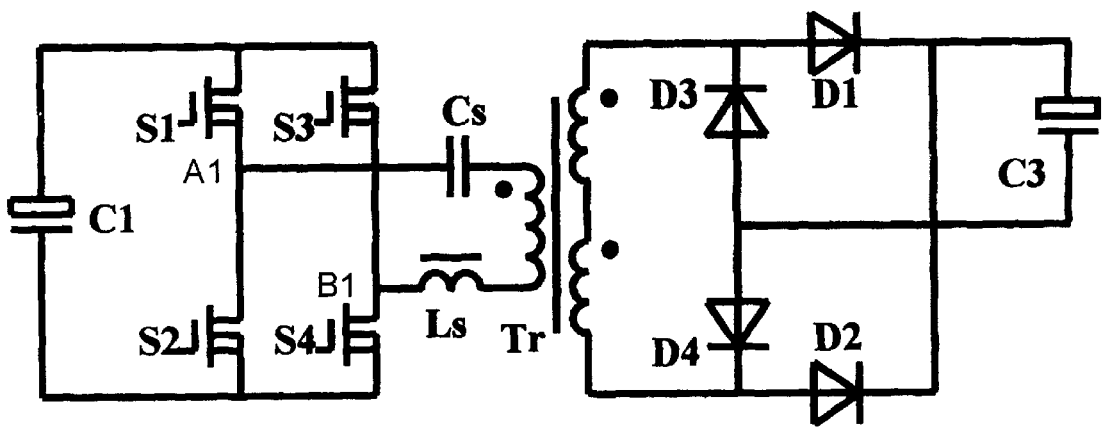
FIG. 5B is a circuit diagram illustrating the switching element of the rectifying circuit in FIG. 4 is switched to the junction point B.

The operation principle of the full-bridge rectifying circuit of the integral DC to DC converter shown in FIG. 4 will be explained in more detail below. The full-bridge switching devices in the first bridge arm, i.e. S1 and S2, are complementarily conducted and shut by a control signal. The full-bridge switching devices in the second bridge arm, i.e. S3 and S4, are complementarily conducted and shut by a corresponding control signal. The DC voltage in the input capacitor C1 is converted through the switching devices S1 to S4 to obtain a high frequency square-wave AC voltage between the midpoint of the first bridge arm, i.e. A1, and the midpoint of the second bridge arm, i.e. B1. The high frequency square-wave AC voltage is applied to the series resonance circuit composed of the series resonant capacitor Cs, the primary winding of the transformer Tr and the series resonant inductor Ls to generate a series resonance, thereby forming a sinusoidal AC current in the primary winding of the transformer Tr. The sinusoidal AC current is then transferred into the upper and lower secondary windings of the transformer Tr and sent to the rectifying circuit composed of diodes D1 to D4. If the output voltage switching element Sm is switched to the point A, the alternative current outputted from the transformer Tr will pass through the rectifier diodes D1 and D2, as can be seen in FIG. 5A; if the output voltage switching element Sm is switched to the point B, the alternative current outputted from the transformer Tr will pass through the rectifier diodes D1 to D4, as can be seen in FIG. 5B. Subsequently, the rectified voltage is sent to the filtering capacitor C3 for being filtered into the output DC voltage. Because the output DC voltage is rectified by passing through the rectifier diodes D1 and D2 when the output switching element Sm is switched to the point A, the amplitude of the output DC voltage depends on the voltage amplitude of the upper or lower secondary winding of the transformer Tr. Because the output DC voltage is rectified by passing through the rectifier diodes D1, D4 and D2, D3 when the output voltage switching element Sm is switched to the point B, the amplitude of the output DC voltage is the summation of the voltage amplitudes outputted from the upper and the lower secondary windings of the transformer Tr. Thus, the output DC voltage in the case the output voltage switching element Sm is switched to point A is a half of that in the case the switching element Sm is switched to the point B. In another words, the output DC voltage in the case the output voltage switching element Sm is switched to the point B is twice as big as that in the case the output switching element Sm is switched to the point A. It is apparent that two output DC voltages can be achieved in the integral DC to DC converter according to the present invention by adjusting the output voltage switching element Sm. For example, the two customarily used direct voltages 24 V and 48 V for communication power supply can be obtained by using only one integral DC to DC converter according to the present invention.

A set of full-bridge switching devices is employed in the DC to AC circuit of the integral DC to DC converter shown in FIG. 4. Certainly, the DC to AC circuit can includes a set of half-bridge switching devices, a set of forward switching devices or a set of push-pull switching devices.

Figure 1:
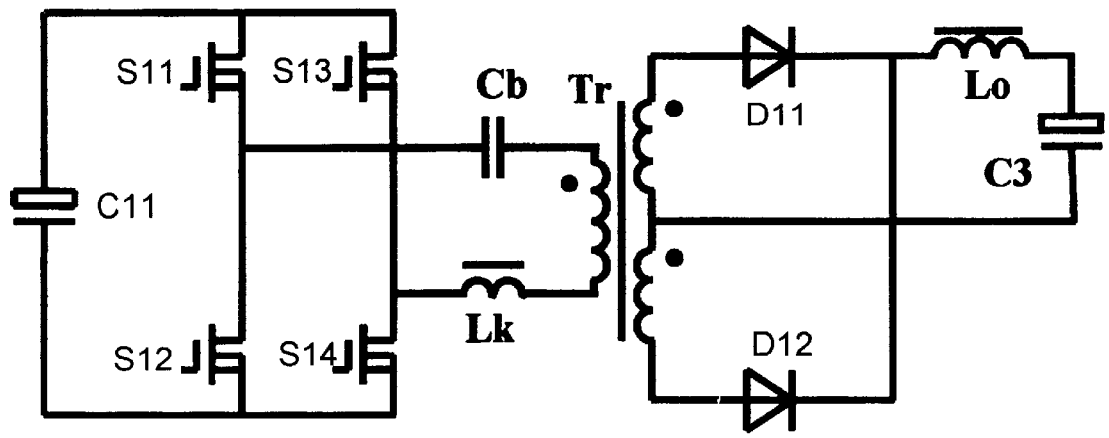
FIG. 1 is a circuit diagram of a full-bridge phase-shifted soft-switching DC to DC converter according to the prior art.
Figure 2:
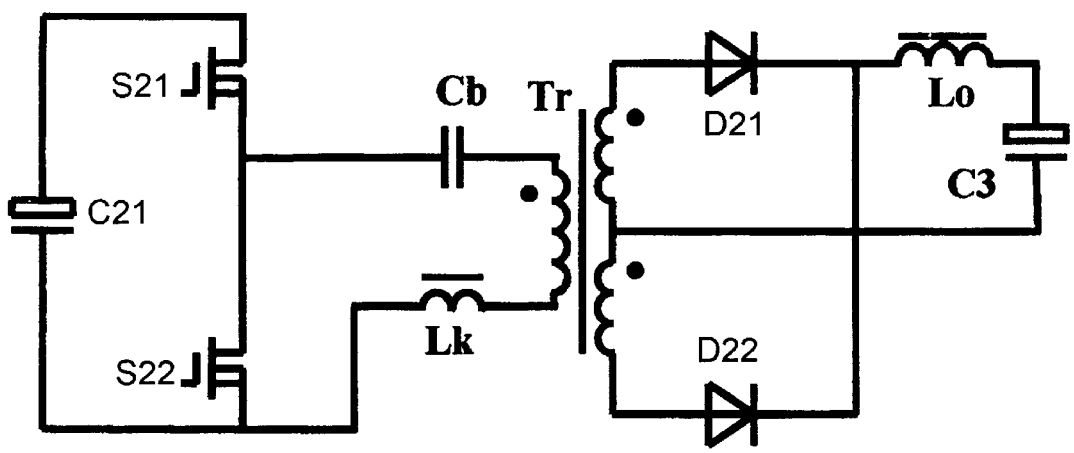
FIG. 2 is a circuit diagram of an asymmetric half-bridge DC to DC converter according to the prior art.
Figure 3:
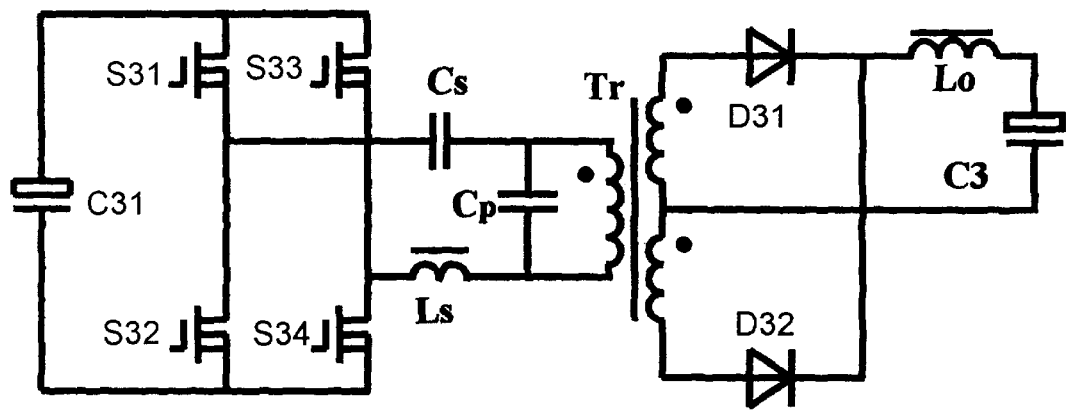
FIG. 3 is a circuit diagram of a full-bridge serial-parallel resonant DC to DC converter according to the prior art.
Figure 6:
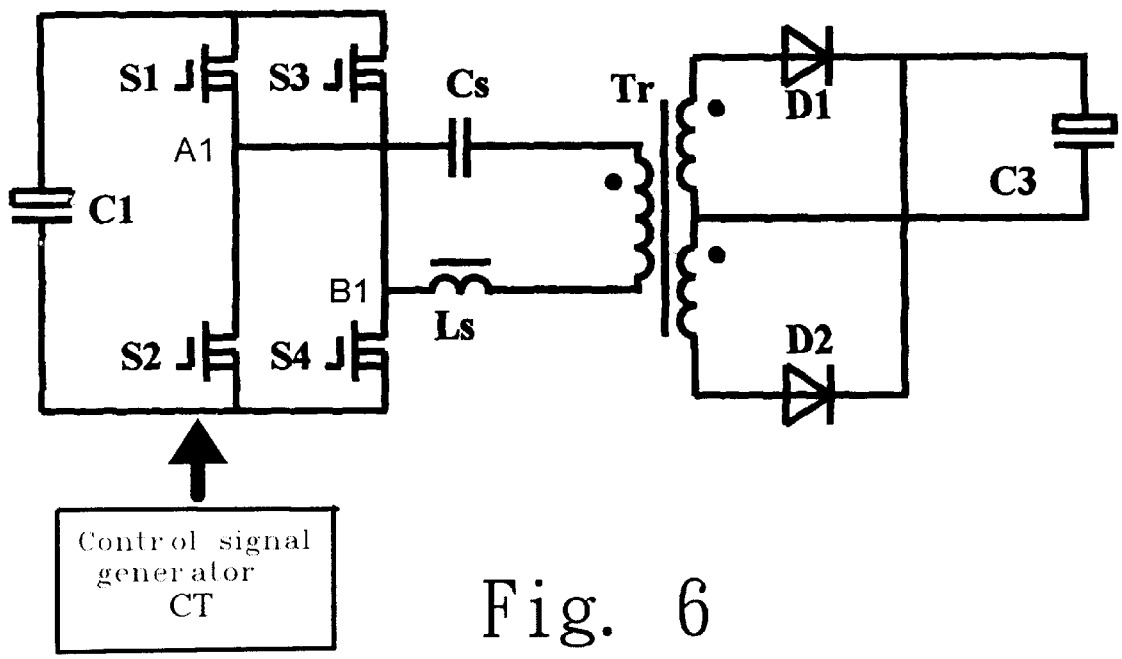
FIG. 6 is a circuit diagram of an integral DC to DC converter according to the second preferred embodiment of the present invention.

Referring to FIG. 6, the integral DC to DC converter for the second preferred embodiment of the present invention, which is implemented by varying the structure of the input circuit. The circuit in FIG. 6 is the similar to that in FIG. 1, but the control signal or the control method of the full-bridge switching devices is different. In FIG. 1, the traditional DC to DC converter is implemented by allowing the switching devices in the first bridge arm, i.e. S11 and S12, and the switching devices in the second bridge arm, i.e. S13 and S14, to complementarily conduct and shut. However, the DC to DC converter according to the present invention, as shown in FIG. 6, has a further control method in addition to having the traditional control method. The further control method is implemented by allowing the switching devices in the first bridge arm, i.e. S1 and S2, to complementarily (alternately) conduct and shut and allowing the upper switching device in the second bridge arm, i.e. S3, to keep shutting and the lower switching device in the second bridge arm, i.e. S4, to keep conducting. That is to say, the control method used in the present DC to DC converter includes two alternative operation states, one of which is the same as prior art and the other is newly disclosed.

The first operation state, which is the same as the prior art, is implemented by allowing the switching devices in the first bridge arm, i.e. S1 and S2, and the switching devices in the second bridge arm, i.e. S3 and S4, to complementarily conduct and shut. The output voltage between the midpoint of the first bridge arm, i.e. A1, and the midpoint of the second bridge arm, i.e. B1, is a square-wave AC voltage. The amplitude of the square-wave AC voltage is the same as the DC voltage amplitude of the input capacitor Cl. If the series-resonant capacitor Cs and the series-resonant inductor Ls are operated under full resonance, the voltage in the primary section of the transformer Tr is equal to the voltage between A1 and B1 and the amplitude thereof is equal to that of the input DC voltage.

Figure 7:
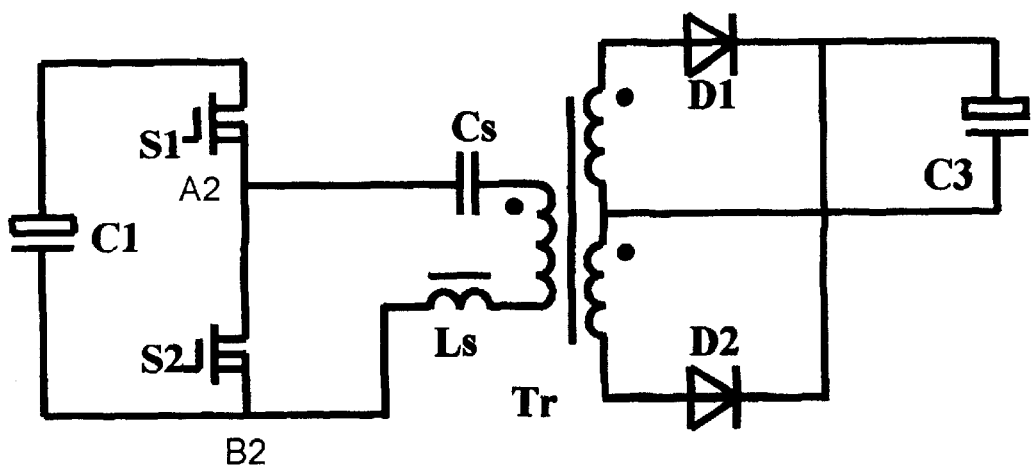
FIG. 7 is a circuit diagram illustrating the control signal generator in FIG. 6 is switched to the second state.

The second operation state, which is newly introduced, is implemented by allowing the switching devices in the first bridge arm, i.e. S1 and S2, and the switching devices in the second bridge arm to complementarily conduct and shut and allowing the upper switching device in the second bridge arm, i.e. S3, to keep shutting and the lower switching device in the second bridge arm, i.e. S4, to keep conducting. In the second operation state, the circuit structure in FIG. 6 can be simplified as the circuit in FIG. 7. The output voltage between the A2 and B2 is a square-wave pulse voltage having half amplitude of the input DC voltage, which is then filtered by the series-resonant capacitor Cs and operated under full resonance with the series-resonant inductor Ls. The voltage amplitude in the primary winding of the transformer Tr is half the input DC voltage. It is apparent that two different input direct voltages can be applied to achieve an equal output voltage according to the integral DC to DC converter of the present invention by varying the operation state thereof.

The control signal of the full-bridge switching devices is provided by a control signal generator CT. The control signal generator CT according to the present invention can include two control signal generators. The first control signal generator is used for allowing the two switching devices in the first bridge arm and the two switching devices in the second bridge arm to alternately conduct and shut. The second control signal generator is used for allowing the two switching devices in the first bridge arm to alternately conduct and shut and allowing the upper switching device in the second bridge arm to keep shutting and the lower switching device in the second bridge arm to keep conducting. Furthermore, these two control signal generators are implemented by using a switching element.

Figure 8:
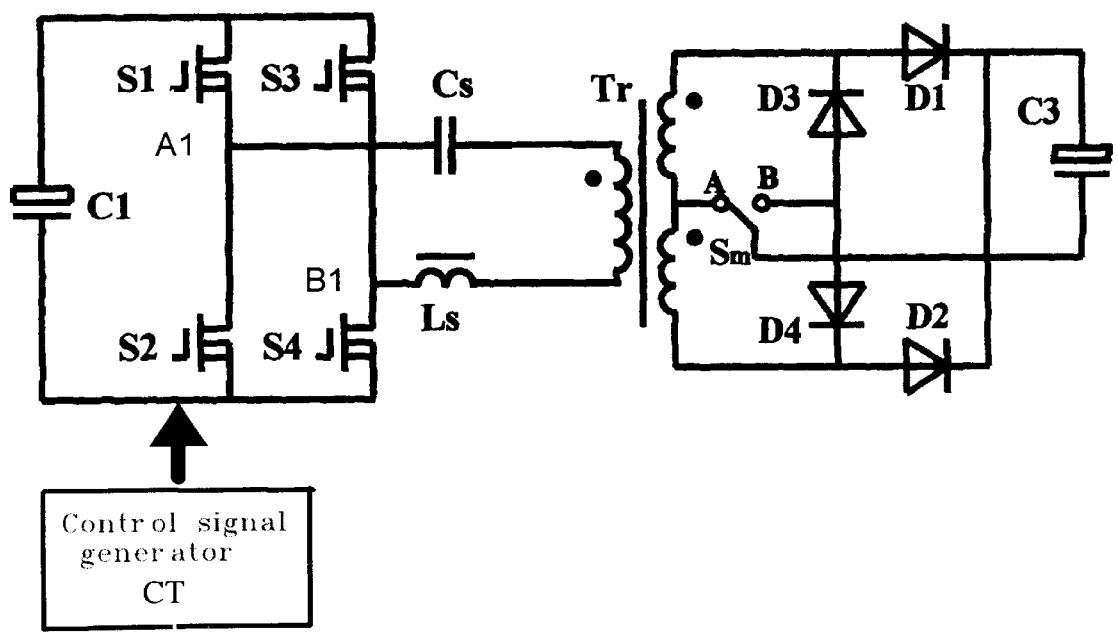
FIG. 8 is a circuit diagram of an integral DC to DC converter according to the third preferred embodiment of the present invention.

The circuit shown in FIG. 4 is provided for converting DC voltage by varying the output circuit. The circuit shown in FIG. 6 is provided for converting DC voltage by varying the input circuit. FIG. 8 shows the third preferred embodiment of the present invention in combination of the circuit in FIG. 4 and the circuit in FIG. 6. The operation principle is the same as the foregoing explanation in FIGS. 4 to 7.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. An integral DC to DC converter for converting at least one input DC voltage into an output DC voltage, comprising:

an input capacitor for providing an input DC voltage;

a DC to AC circuit connected with said input capacitor for converting said input DC voltage to a high frequency first AC voltage wherein said DC to AC circuit comprises a full-bridge switching device having two switching devices located in a first bridge arm and two switching devices located in a second bridge arm;

a transformer having primary and secondary windings for converting said first AC voltage into a second AC voltage wherein the primary winding of said transformer is connected to said DC to AC circuit;

a rectifying circuit connected to the secondary winding of said transformer for rectifying said second AC voltage to said output DC voltage wherein said rectifying circuit comprises rectifier diodes;

a filtering capacitor connected to said rectifying circuit for filtering said output DC voltage; and a control signal generator for providing a first control signal and a second control signal in response to said input DC voltage to control said full-bridge switching device in two alternative operation states, wherein said first control signal allows the two switching devices in said first bridge arm and the two switching devices in said second bridge arm to alternately conduct and shut, and said second control signal allows the two switching devices in said first bridge arm to alternately conduct and shut and allows the upper switching device in said second bridge arm to keep shutting and the lower switching device in said second bridge arm to keep conducting.

2. The integral DC to DC converter according to claim 1, wherein said rectifying circuit includes four full-bridge rectifying diodes and further comprises an output voltage switching element.

3. The integral DC to DC converter according to claim 2, wherein the junction point of said output voltage switching element is connected to said filtering capacitor and the ends of said output voltage switching element are connected with the co-anode of said four full-bridge rectifier diodes and the central tapping head of said transformer.

4. An integral DC to DC converter according to claim 1, wherein said rectifying circuit comprises four full-bridge rectifier diodes and said control signal generator comprises a first control signal generator and a second control generator.

5. The integral DC to DC converter according to claim 4, wherein said first control signal generator is used to provide said first control signal.

6. The integral DC to DC converter according to claim 4, wherein said second control signal generator is used to provide said second control signal.

7. The integral DC to DC converter according to claim 4, further comprising a switching element for activating one of said first control signal generator and said second control signal generator.

8. An integral DC to DC converter for converting at least one input DC voltage into at least one output DC voltage, comprising:

an input capacitor for providing an input DC voltage;

a DC to AC circuit connected with said input capacitor for converting said input DC voltage to a high frequency first AC voltage wherein said DC to AC circuit comprises four full-bridge switching devices;

a transformer having primary and secondary windings for converting said first AC voltage into a second AC voltage wherein the primary winding of said transformer is connected to said DC to AC circuit;

a rectifying circuit connected to the secondary winding of said transformer for rectifying said second AC voltage to said output DC voltage wherein said rectifying circuit comprises four full-bridge rectifier diodes;

a filtering capacitor connected to said rectifying circuit for filtering said output DC voltage; and an output voltage switching element operated to control said output DC voltage in two alternative operation states, wherein the junction point of said output voltage switching element is connected to said filtering capacitor and the ends of said output voltage switching element are connected with the co-anode of said four full-bridge rectifier diodes and the central tapping head of said transformer.

9. An integral DC to DC converter for converting at least one input DC voltage into at least one DC voltage, comprising:

an input capacitor for providing an input DC voltage;

a DC to AC circuit connected with said input capacitor for converting said input DC voltage to a high frequency first AC voltage wherein said DC to AC circuit comprises a full-bridge switching device having two switching devices in a first bridge arm and two switching devices in a second bridge arm;

a transformer having primary and secondary windings for converting said first AC voltage into a second AC voltage wherein the primary winding of said transformer is connected to said DC to AC circuit;

a rectifying circuit connected to secondary winding of said transformer for rectifying said second AC voltage to said output DC voltage wherein said rectifying circuit comprises four full-bridge rectifier diodes;

a filtering capacitor connected to said rectifying circuit for filtering said output DC voltage;

a control signal generator for providing a first control signal and a second control signal in response to said input DC voltage to control said full-bridge switching device in two alternative operation states, wherein said first control signal allows the two switching devices in said first bridge arm and the two switching devices in said second bridge arm to alternately conduct and shut, and said second control signal allows the two switching devices in said first bridge arm to alternately conduct and shut, an upper switching device in said second bridge arm to keep shutting and a lower switching device in said second bridge arm to keep conducting; and an output voltage switching element operated to control said output DC voltage in two alternative operation states, wherein the junction point of said output voltage switching element is connected to said filtering capacitor and ends of said output voltage switching element are connected with a co-anode of said four full-bridge rectifier diodes and a central tapping head of said transformer.

* * * * *